May 19, 1964  H. SCHIEBER ETAL  3,133,582

VEHICLE TRACTION CHAIN

Filed Dec. 10, 1962

INVENTORS:
HANS SCHIEBER
PAUL BINDEL
BY
ATT'YS

United States Patent Office 3,133,582
Patented May 19, 1964

3,133,582
VEHICLE TRACTION CHAIN
Hans Schieber, 2270 W. Logan Blvd., and Paul Bindel, 3947 W. North Ave., both of Chicago, Ill.
Filed Dec. 10, 1962, Ser. No. 243,326
2 Claims. (Cl. 152—233)

This invention relates to improvements in motor-vehicle-tire traction chains.

The main objects of this invention are; to provide an improved form of traction chain for motor vehicles to ensure traction for the drive wheels on roads where, due to the elements, they have become icy, full of snow and/or muddy, and thereby the wheels require assistance to obtain traction when slippery conditions prevail; to provide an improved form of traction chain of this kind whereby one or more may be placed over a tire tread; to provide improved anchoring means permitting the facile placing of the traction chain on a drive wheel and the equally-facile removal of the chain from a drive wheel; to provide an improved traction chain of this kind especially adapted for use with the wheels of heavy-duty motor-vehicles, such as trucks, where the wheels, inwardly of the tire-supporting rim, have openings through which a bolt may be inserted for embracively positioning and securing the traction chain over the tire tread; to provide an improved traction chain of this kind incorporating means for protecting the tire against unnecessary abrasion; and to provide a device of the foregoing character which is relatively simple in construction, and inexpensive to manufacture.

In the adaptation shown in the accompanying drawings.

Figure 1:
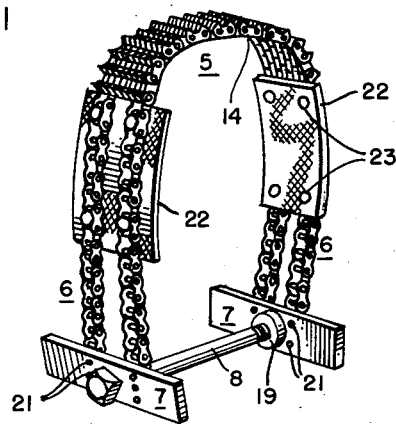
FIGURE 1 is a perspective view of a traction chain, constructed in accordance with this invention, in the form it assumes when placed over the tire on a vehicle wheel.
Figure 2:
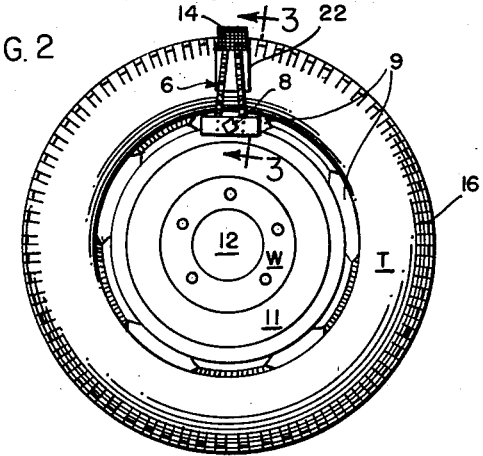
FIG. 2 is a face view of one type of a conventional motor-vehicle wheel mounting a traction chain such as shown in FIG. 1.

The essential concept of this invention involves a traction element to the ends of which are attached oppositely-extending connectors the free ends of which are connected by a transversely-disposed bolt extendable through the usual aperture in the wheel, the turning of which bolt draws the connectors together to firmly set the traction element over the tire tread.

A motor-vehicle-tire traction chain embodying the foregoing concept comprises a traction element 5 interposed between oppositely extending connectors 6 anchored at their free respective ends to bars 7 positionable in opposed spaced relationship on opposite sides of a wheel W for spanning by a bolt 8 extending through an opening 9 in that portion 11 of the wheel W which is intermediate a hub 12 and the rim 13 whereon is seated a tire T.

The traction element 5 is shown as comprising multiple parallel series of pronged links hinged together. In length such a traction element 5 is somewhat greater than the tread 16 of the tire T with which the element is to be used. In width the traction element 5 is that of substantially eight or ten parallel series of the pivoted links, or the like.

Figure 3:
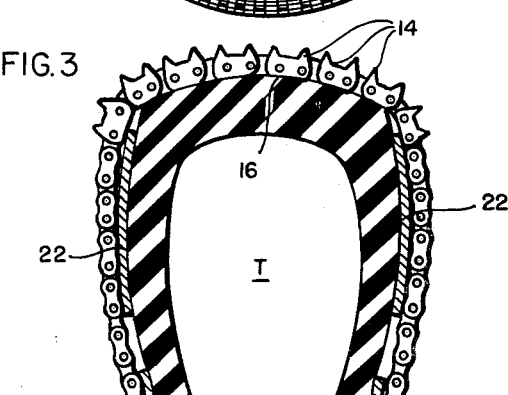
FIG. 3 is an enlarged, transverse, sectional view taken on the plane of the line 3—3 of FIG. 2.

The connectors 6 here are shown as conventional sprocket-type chains a pair of which is attached to each free end of the traction element 5. In length these connector chains 6 are such that the end links are disposed below the rim 13 (FIG. 3) of the wheel W when the traction element 5 is set over the tire tread 16.

Figure 4:
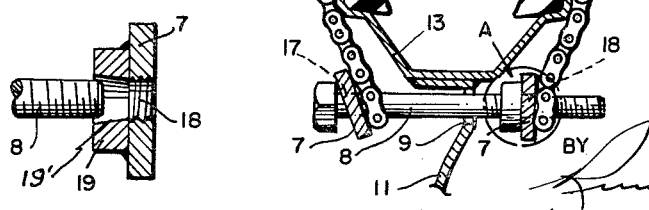
FIG. 4 is an enlarged, cross-sectional view of the bar and guideway shown in the circle "A" of FIG. 3, with the attaching bolt in position to be threaded into the bar to anchor the chain in operative position on a vehicle tire, as shown in FIG. 2.

The bars 7 here are shown as oblong pieces of rigid strap-metal somewhat greater in length than the width of the traction element 5. These bars 7 have medial apertures 17 and 18, respectively, formed therein. The latter aperture 18 is threaded as shown in FIG. 4. In order to afford more facile manner of guiding the threaded end of the bolt 8 to the threaded aperture 18, a guide 19 is bonded to the inner face of the threaded bar 7 in registration with the aperture 18 and is provided with an inwardly extending taper 19'. The bars 7 here are shown as secured by rivets 21 to the end links of the respective connector chains 6, with the threaded apertures 17 and 18 intermediate the ends of the chains 6.

Pads 22 are secured, by rivets 23, to the inner faces of the connector chains 6 directly adjacent the ends of the traction element 5. These pads 22 set against the opposite sides or walls of the tire T to protect it against undue abrasion that otherwise might result from any relative shifting of the connector chains 6 on the tire.

A traction chain, embodying this invention, is so structured for use primarily with motor trucks, the wheels of which, as a rule, have openings 9 therein. However, such a traction chain could be structured for use with any motor vehicle the drive wheels for which have openings inwardly of the tire-supporting rim 13.

When not in use the bolt 8 is withdrawn from the threaded aperture 18 in the one bar 7—and possibly from the aperture 17 in the other bar, if desired. Either rolled up or load out flat, such a traction chain takes very little storage space and is available readily for use when required. As should be obvious the bolt should be reseated in the threaded aperture to prevent loss.

The attachment of a traction chain, constructed in accordance with this invention, is a most simple and facile action. It requires only the setting of the traction element 5 over the tread 16 of the tire T, with the connector chains 7 depending along the opposite sides of the tire. With the apertures 17 and 18, in the bars 7, aligned and in registration with an opening 9 in the wheel W, the bolt 8 is inserted through the aperture 17 in the one bar 7, through the wheel opening 9, and then threaded into the aperture 18 in the other bar 7. As the bolt 8 is turned it draws the ends of the connector chains 6 toward each other until they set the traction element 5 in firm contact over the tread 16 of the tire T. Although the bolt 8 shown herein is formed with a hexagonal head and requires a tool to tighten and loosen the bolt into and out of operative position it should be obvious that the bolt head may take any form such as for instance a wing for tightening the bolt by hand. Also lock washers may be employed to prevent accidental loosening of the bolt from its threaded seat.

Although but one specific embodiment of this invention is herein shown and described it will be understood that details of the construction shown may be altered or omitted without departing from the spirit of the invention as defined by the following claims.

We claim:

1. A motor-vehicle-tire traction-chain comprising, a traction element in the form of a series of parallel pronged links in over-all length greater than that of the transverse width of a tire tread, a pair of sprocket-chain connectors attached to each end of the traction-element links and each pair of a length to extend below the inner periphery of a tire, a bar anchored to each of the free ends of each pair of connectors and lying in plane transverse to that of said connectors, the bars having aligned apertures therein intermediate the respective attached connector chains, one bar aperture being threaded, and a bolt insertable through the other bar aperture and into threaded engagement with the one bar aperture, when the traction element is set on the tire tread with the pairs of connector chains depending along the opposite sides of the tire, to draw the unobstructed bars toward each other to tension the traction-element on the tire tread.

2. A motor-vehicle-tire traction-chain as set forth in claim 1 wherein an unthreaded guide is positioned ahead of and cooperating with said threaded aperture to facilitate ready entrance of the free end of the bolt into threaded engagement in said threaded aperture.

References Cited in the file of this patent

UNITED STATES PATENTS

| | | |
|---|---|---|
| 1,535,620 | Morgan | Apr. 28, 1925 |
| 2,412,896 | Luce | Dec. 17, 1946 |
| 2,955,634 | Schieber et al. | Oct. 11, 1960 |